United States Patent
Howard

[11] Patent Number: 6,051,641
[45] Date of Patent: Apr. 18, 2000

[54] ARTICLES HAVING REDUCED PIGMENT SWIRLING

[75] Inventor: Harry R. Howard, Medina, Ohio

[73] Assignee: Teknor Apex Company, Pawtucket, R.I.

[21] Appl. No.: 09/072,600

[22] Filed: May 5, 1998

[51] Int. Cl.[7] .................................................. C08K 3/18
[52] U.S. Cl. .......................................................... 524/430
[58] Field of Search ............................................... 524/430

[56] References Cited

U.S. PATENT DOCUMENTS

| | | |
|---|---|---|
| 1,541,831 | 6/1925 | Linder . |
| 2,972,785 | 2/1961 | Touceda . |
| 3,800,016 | 3/1974 | Roberts ..................................... 264/45 |
| 3,950,482 | 4/1976 | Looman et al. ......................... 264/310 |
| 3,976,608 | 8/1976 | Buckler ....................................... 260/4 |
| 4,183,883 | 1/1980 | Blair ....................................... 264/40.1 |
| 4,373,013 | 2/1983 | Yoshizumi ............................... 428/570 |
| 4,587,318 | 5/1986 | Inoue et al. .............................. 526/282 |
| 4,808,364 | 2/1989 | Blunt et al. .............................. 264/310 |
| 4,857,257 | 8/1989 | Chen et al. .............................. 264/310 |
| 4,898,771 | 2/1990 | Havens ..................................... 428/316 |
| 4,900,785 | 2/1990 | Leitz ......................................... 525/67 |
| 4,946,638 | 8/1990 | Takamatsu .............................. 264/302 |
| 4,988,748 | 1/1991 | Fuhr ......................................... 524/141 |
| 5,082,902 | 1/1992 | Gurevitch et al. ....................... 525/240 |
| 5,232,644 | 8/1993 | Hammond et al. ........................ 264/73 |
| 5,300,550 | 4/1994 | Eckel ....................................... 524/444 |
| 5,308,700 | 5/1994 | Hikasa et al. ........................... 428/402 |
| 5,340,512 | 8/1994 | Slocum et al. ............................ 264/37 |

OTHER PUBLICATIONS

"Pigment Swirling in Rotationally Molded Parts," published prior to 1980.

*Primary Examiner*—Paul R. Michl
*Attorney, Agent, or Firm*—Fish & Richardson P.C.

[57] ABSTRACT

Articles having reduced pigment swirling are disclosed. The articles can include a resin, one or more pigments and less than about 1 percent by weight of a non-hygroscopic antistatic agent.

13 Claims, No Drawings

ARTICLES HAVING REDUCED PIGMENT SWIRLING

BACKGROUND OF THE INVENTION

The invention relates to articles having reduced pigment swirling.

Rotomolded articles can be formed of a blend of a resin and one or more pigments. Typically, during rotomolding the blend is placed in a mold, and the mold is biaxially rotated while being heated.

During the early stages of mold rotation, a static charge can be generated. This can result in a molded article having a non-uniform color pattern, commonly referred to as pigment swirling.

Organic anti-static agents have been used to try to control pigment swirling in rotomolded articles. Often, these anti-static agents function by drawing moisture from the air to become conductive and dissipate the static charge. As a result, the ability of organic anti-static agents to reduce pigment swirling can depend upon the humidity of the environment in which rotomolding occurs. Moreover, these anti-static agents can act as mold release agents which can cause premature separation of the article from the mold. In addition, organic anti-static agents often have low melting points, so they can soften and cause agglomeration of the powdered pigment which can result in specks in the molded article.

Non-hygroscopic anti-static agents are known, and have been used in relatively high concentration to reduce static charge.

SUMMARY OF THE INVENTION

The invention relates to articles that have reduced pigment swirling and that can be made by a rotomolding process. The reduction in pigment swirling can be achieved by using relatively low concentrations of non-hygroscopic anti-static agents in the blend of resin and pigment(s). The articles can be prepared in a relatively low humidity environment and generally exhibit good impact resistance.

In one aspect, the invention features an article that includes a resin, one or more pigments and a non-hygroscopic anti-static agent. The article includes less than about 1 percent by weight of the anti-static agent.

In another aspect, the invention features an article that includes a resin, one or more pigments and a non-hygroscopic anti-static agent present in an amount sufficient to reduce the pigment swirling index to less than about 15 percent. The "Pigment swirling index", as used herein, refers to the relative amount of the surface area of an article that has non-uniform color distribution as observed with the naked eye in normal light.

In another aspect, the invention features a method of making an article. The method includes rotomolding a composition including a resin, one or more pigments and an anti-static agent. The composition includes less than about 0.1 weight percent of the anti-static agent.

In another aspect, the invention features a method of making an article. The method includes rotomolding a composition that includes a resin, one or more pigments and a non-hygroscopic anti-static agent. The composition includes less than about 1 weight percent of the anti-static agent.

In another aspect, the invention features a rotomoldable composition that includes a resin, one or more pigments and a non-hygroscopic anti-static agent. The composition includes less than about 1 percent by weight of the anti-static agent.

Other features and advantages of the invention will be apparent from the description of the preferred embodiments thereof, and from the claims.

DESCRIPTION OF THE PREFERRED EMBODIMENTS

The preferred articles have reduced pigment swirling and are formed of a resin, one or more pigments and a non-hygroscopic anti-static agent.

Preferably, the articles have a pigment swirling index of less than about 15 percent, more preferably less than about 10 percent, and most preferably less than about 3 percent.

Examples of resins include polyethylene, polypropylene, polycarbonate and nylon. Resins can be used alone or in combination.

The pigment(s) should not adversely effect the properties of the resin during or after molding under the process conditions disclosed herein. Generally, a pigment can be inorganic or organic compounds. Examples of pigments include phthalocyanines, quinacridones, azo compounds and cadmium compounds, such as green #7, green #17, green #26, blue #29, white #6, black #7, yellow #184, yellow #119, brown #24 and red #108. Colorants, which are combinations of pigments, can be used.

The amount of pigment should be selected so that the article has desirable color characteristics. Preferably, the article includes less than about 2 grams of pigment per pound of resin, more preferably less than about 1 gram of pigment per pound of resin, and most preferably from about 0.5 grams to about 1 gram of pigment per pound of resin.

Anti-static agents include organic anti-static agents and non-hygroscopic anti-static agents. Typically, non-hygroscopic anti-static agents include one or more metal atoms. Metals, metal oxides, alloys, oxides of alloys, intermetallics, oxides of intermetallics and combinations of these materials can act as non-hygroscopic anti-static agents. Examples of non-hygroscopic anti-static agents include fumed alumina, calcined alumina, copper, copper oxide, nickel, nickel oxide, zinc and zinc oxide. Non-hygroscopic anti-static agents can be used alone or in combination.

The amount of anti-static agent present in the composition should be selected so that the article has reduced pigment swirling relative to when the composition does not contain the anti-static agent. Typically, the article includes less than about 1 percent anti-static agent by weight. Preferably, the article includes less than about 0.5 percent anti-static agent by weight, more preferably from about 0.02 percent to about 0.18 percent anti-static agent by weight, and most preferably from about 0.02 percent to about 0.45 percent anti-static agent by weight.

In some instances, when combined with a specific pigment, reduced pigment swirling can be achieved when an article includes less than about 0.1 percent by weight of the anti-static agent. For some pigments, pigment swirling can be reduced when the article includes less than about 0.022 weight percent of the anti-static agent. For example, for colorants formed of about 59.96 weight percent of green #7, about 4.34 weight percent of blue #29, about 21.96 weight percent of white #6, about 10.67 weight percent of black #7 and about 3.47 weight percent of yellow #184, pigment swirling can be reduced when the article includes about 0.022 percent fumed alumina by weight. Furthermore, for colorants formed of about 0.16 weight percent black #7, about 99.19 weight percent white #6 and about 0.65 weight percent green #26, pigment swirling can be reduced when the article includes about 0.022 percent calcined alumina by weight.

The articles can exhibit good impact resistance. Preferably, an article has an impact resistance of at least about 45 foot-pounds, more preferably at least about 50 foot-pounds, and most preferably at least about 55 foot-pounds. The impact resistance is measured according to the falling dart impact test described below.

The articles can be formed by a rotomolding process. Typically, the resin, anti-static agent and pigment or colorant are combined, blended then placed in a mold. The composition can then be rotated while being subjected to heat using standard rotomolding techniques.

EXAMPLES

The following compositions were prepared by mixing the pigments at ambient temperature in a laboratory high intensity mixer. The resin was added to this mixture and this composition was mixed at ambient temperature.

The compositions were each disposed in a Ferry Rotolab 400 rotomolding machine. The oven temperature was held at about 595° F. The oven cycle time was about 17 minutes. The mold was cooled for about 5 minutes with an air delay. The mold was then water sprayed for about 2 minutes. The relative humidity was measured using a hygrometer mounted adjacent the rotomolding apparatus.

The impact resistance of the rotomolded articles was measured by first cutting twelve 5 inch by 5 inch by 0.125 inch portions from each of the articles. Each portion was stored at about −40° C. for at least about 4 hours and subsequently impacted with a falling dart dropped from increasing heights in accordance with the Association of Rotational Molders (ARM) test ("the falling dart impact test"). The impact values were obtained by multiplying the maximum drop height by the weight of the dart.

Composition No. 1:

The colorant included about 59.96 weight percent of green #7, about 4.34 weight percent of blue #29, about 21.96 weight percent of white #6, about 10.67 weight percent of black #7 and about 3.47 weight percent of yellow #184.

The resin was linear medium density polyethylene MP-643-661 available from Millenium Petrochemical.

The anti-static agent was fumed alumina (Aluminum oxide C, from Degussa Corp.).

The composition included about 0.022 weight percent of the fumed alumina and about 0.6 grams of colorants per pound of resin. During rotomolding, the relative humidity was between about 30% and about 32%.

Pigment swirling index: about 0%.

Impact resistance: between about 55 foot-pounds and about 60 foot-pounds.

Composition No. 2:

The same colorant and resin as in composition no. 1 were used.

The anti-static agent was calcined alumina (1000 SGD, from Alcoa Aluminum & Chemical Co.).

The composition included about 0.022 weight percent of the calcined alumina and about 0.6 grams of colorant per pound of resin. During rotomolding, the relative humidity was between about 30% and about 32%.

Pigment swirling index: from about 10% to about 15%.

Impact resistance: between about 55 foot-pounds and about 60 foot-pounds.

Composition No. 3:

The same colorant, resin and anti-static agent as in composition no. 2 were used.

The composition included about 0.044 weight percent of the calcined alumina and about 0.6 grams of colorant per pound of resin. During rotomolding, the relative humidity was between about 30% and about 32%.

Pigment swirling index: from about 3% to about 10%.

Impact resistance: between about 55 foot-pounds and about 60 foot pounds.

Composition No. 4:

The same colorant, resin and anti-static agent as in composition no. 2 were used.

The composition included about 0.088 weight percent of the calcined alumina and about 0.6 grams of colorant per pound of resin. During rotomolding, the relative humidity was between about 30% and about 32%.

Pigment swirling index: from about 3% to about 10%.

Impact resistance: between about 55 foot-pounds and about 60 foot-pounds.

Composition No. 5:

The same colorant and resin as in composition no. 1 were used.

The anti-static agent included the same calcined alumina as used in composition no. 2 and the same fumed alumina as used in composition no. 1.

The composition included about 0.088 weight percent of the calcined alumina, about 0.044 weight percent of the fumed alumina and about 0.6 grams of colorant per pound of resin. During rotomolding, the relative humidity was between about 30% and about 32%.

Pigment swirling index: about 0%.

Impact resistance: between about 55 foot-pounds and about 60 foot pounds.

Composition No. 6:

The colorant included about 17.59 weight percent of black #7, about 45.79 weight percent of white #6 and about 36.62 weight percent of yellow #119.

The resin was linear medium density polyethylene MP635-661, available from Millenium Petrochemical.

The anti-static agent was the same fumed alumina as used in composition no. 1.

The composition included about 0.022 weight percent of the fumed alumina and about 0.55 grams of the colorant per pound of resin.

Pigment swirling index: about 0%.

Impact resistance: between about 55 and about 60 foot-pounds.

Composition No. 7:

The same resin and colorant as used in composition no. 6 were used.

The anti-static agent was the same calcined alumina as used in composition no. 2.

The composition included about 0.022 weight percent of the fumed alumina and about 0.55 grams of the colorant per pound of resin.

Pigment swirling index: about 0%.

Impact resistance: between about 55 foot-pounds and about 60 foot-pounds.

Composition No. 8:

The colorant included about 0.16 weight percent of black #7, about 99.19 weight percent of white #6 and about 0.65 weight percent of green #26.

The resin was linear medium density polyethylene HRP-134, available from Mobil Chemical.

The anti-static agent was the same as the fumed alumina used in composition no. 1.

The composition included about 0.022 weight percent of the fumed alumina and about 0.97 grams of the colorant per pound of the resin. During rotomolding, the relative humidity was between about 25% and about 28%.

Pigment swirling index: greater than about 15%.

Composition No. 9:

The same colorant, resin and anti-static as used in composition no. 8 were used.

The composition included about 0.044 weight percent of the fumed alumina and about 0.97 grams of the pigment per pound of the resin. During rotomolding, the relative humidity was between about 25% and about 28%.

Pigment swirling index: greater than about 15%.

Composition No. 10:

The same colorant, resin and anti-static as used in composition no. 8 were used.

The composition included about 0.088 weight percent of the fumed alumina and about 0.97 grams of the colorant, per pound of the resin. During rotomolding, the relative humidity was between about 25% and about 28%.

Pigment swirling index: from about 3% to about 10%.

Composition No. 11:

The same colorant, resin and anti-static as used in composition no. 8 were used.

The composition included about 0.176 weight percent of the fumed alumina and about 0.97 grams of the colorant per pound of the resin. During rotomolding, the relative humidity was between about 25% and about 28%.

Pigment swirling index: about 0%.

Impact resistance: between about 35 foot-pounds and about 40 foot-pounds.

Composition No. 12:

The same colorant and resin as used in composition no. 8 were used.

The anti-static agent was the same as the calcined alumina used in composition no. 2.

The composition included about 0.022 weight percent of the calcined alumina and about 0.97 grams of the colorant per pound of the resin. During rotomolding, the relative humidity was between about 25% and about 28%.

Pigment swirling index: about 0%.

Composition No. 13:

The pigment was white #6.

The resin was linear medium density polyethylene Mp-643-661, available from Millenium Petrochemical.

The anti-static agent was the same fumed alumina as used in composition no. 1.

The composition included about 0.044 weight percent of the fumed alumina and about 0.8 grams of the pigment per pound of the resin.

Pigment swirling index: about 0%.

Impact resistance: between about 50 foot-pounds and about 55 foot pounds.

Composition No. 14:

The pigment was about 76.51 weight percent of white #6, about 23.29 weight percent of yellow #119 and about 0.20 weight percent of black #7.

The resin was linear medium density polyethylene HRP-134, available from Mobil Chemical.

The anti-static agent was the same calcined alumina as used in composition no. 2.

The composition included about 0.044 weight percent of the calcined alumina and about 0.88 grams of the pigment per pound of the resin.

Pigment swirling index: about 0%.

Composition No. 15:

The colorant was about 85.94 weight percent green #17, about 7.81 weight percent brown #24 and about 6.25 weight percent of black #7.

The resin was linear medium density polyethylene MP643-661, available from Millenium Petrochemical.

The anti-static agent was the same fumed alumina as used in composition no. 1.

The composition included about 0.044 weight percent of the fumed alumina and about 1.02 grams of the colorant per pound of the resin. During rotomolding, the relative humidity was about 32%.

Pigment Swirling Index: about 0% to about 3%.

Composition No. 16:

The colorant was about 69.77 weight percent red #108 and about 30.23 weight percent red (fluorescent).

The resin was linear medium density polyethylene MP 643-661, available from Millenium Petrochemical.

The anti-static agent included the fumed alumina used in composition no. 1 and the calcined alumina used in composition no. 2.

The composition included about 0.044 weight percent of the fumed alumina, about 0.088 weight percent of the calcined alumina and about 0.77 grams of the pigment per pound of the resin.

Pigment Swirling Index: about 0%.

Other embodiments are in the claims.

What is claimed is:

1. A rotomolded article, comprising a resin a pigment; and a non-hygroscopic anti-static agent comprising a metal-containing compound, wherein the rotomolded article comprises less than 0.5 percent by weight of the non-hygroscopic anti-static agent, and wherein the rotomolded article has a pigment swirling index of less than about 15%, wherein the non-hygroscopic anti-static agent is selected from the group consisting of fumed alumina, calcined alumina and mixtures thereof.

2. The rotomolded article of claim 1, wherein the rotomolded article comprises from about 0.02 percent to about 0.18 percent by weight of the non-hygroscopic anti-static agent.

3. The rotomolded article of claim 1, wherein the non-hygroscopic anti-static agent comprises fumed alumina.

4. The rotomolded article of claim 1, wherein the non-hygroscopic anti-static agent comprises calcined alumina.

5. The rotomolded article of claim 1, wherein the pigment swirling index of the rotomolded article is less than about 3%.

6. A method of making an article, comprising:

rotomolding a composition comprising a resin, a pigment and a non-hygroscopic anti-static agent selected from the group consisting of fumed alumina, calcined alumina and mixtures thereof, wherein the composition comprises less than about 0.5 percent by weight of the anti-static agent to form a rotomolded article having a pigment swirling index of less than about 15%.

7. The method of claim 6, wherein the composition comprises from about 0.02 percent to about 0.05 percent by weight of the anti-static agent.

8. The method of claim 6, wherein the composition includes green #7, blue #29, white #6, black #7 and yellow #184 and the anti-static agent is fumed alumina.

9. The method of claim 6, wherein the composition includes black #7, white #6 and green #26 and the anti-static agent is calcined alumina.

10. The rotomolded article of claim 7, wherein the pigment comprises green #7, blue #29, white #6, black #7 and yellow #184.

11. The rotomolded article of claim 8, wherein the pigment comprises black #7, white #6 and green #26.

12. The rotomolded article of claim 1, wherein the pigment swirling index is less than about 10%.

13. The method of claim 6, wherein the composition comprises less than about 0.1% by weight of the anti-static agent.

* * * * *